(No Model.)

T. P. LOWRY.
COTTON PLANTER.

No. 350,311. Patented Oct. 5, 1886.

WITNESSES:
Chas. Nida
C. Sedgwick

INVENTOR:
T. P. Lowry
BY Munn & Co
ATTORNEYS.

UNITED STATES PATENT OFFICE.

TALMAN PORTER LOWRY, OF BRYAN, TEXAS.

COTTON-PLANTER.

SPECIFICATION forming part of Letters Patent No. 350,311, dated October 5, 1886.

Application filed December 28, 1885. Serial No. 186,881. (No model.)

*To all whom it may concern:*

Be it known that I, TALMAN PORTER LOWRY, of Bryan, in the county of Brazos and State of Texas, have invented certain new and useful Improvements in Cotton-Planters, of which the following is a full, clear, and exact description.

Reference is to be had to the accompanying drawings, forming part of this specification, in which similar letters of reference indicate corresponding parts in both the figures.

Figure 1:
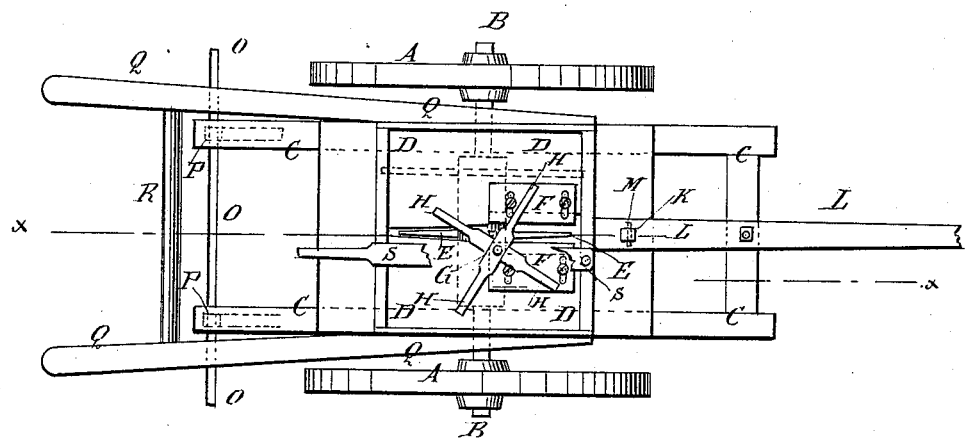
Figure 2:
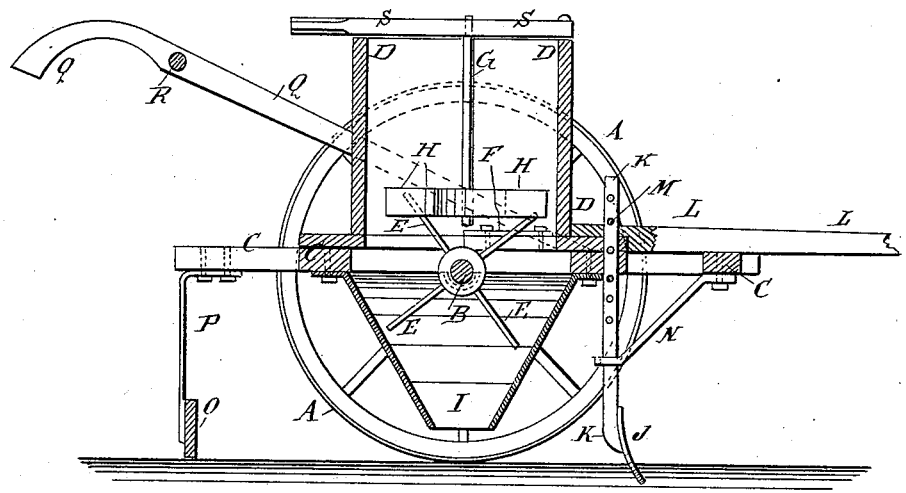

Figure 1 is a plan view of my improved cotton-planter, part of the beam being broken away. Fig. 2 is a sectional side elevation of the same, taken through the broken line $x$ $x$, Fig. 1.

The object of this invention is to provide cotton-planters constructed in such a manner that the cotton will be planted uniformly, and which shall be simple in construction and convenient in use.

The invention consists in the construction and combination of various parts of the planter, as will be hereinafter fully described.

A represents the wheels, the axle B of which revolves in bearings attached to the side bars of the frame C. To the middle part of the frame C is attached the hopper D, the bottom of which is slotted for the passage of the radial fingers E, attached to the axle B. The rear part of the slot in the hopper-bottom is made only wide enough for the passage of the fingers E; but the forward part of the said slot is widened to allow the said fingers to carry the cotton-seed with them as they pass out through the said slot. The width of the forward part of the slot in the hopper-bottom is regulated by the plates F, which are slotted to receive the screws that fasten them to the hopper-bottom, so that the said plates can be readily adjusted wider apart or closer together, according as more or less seed is required to be planted.

To the bottom of the hopper D, and to a bar, S, attached to the top of the said hopper, is journaled a shaft, G, to the lower part of which are attached radial arms H, which are made wide to serve as paddles to push the cotton-seed over the forward part of the slot in the hopper-bottom, so that the said seed will be pushed out through the said slot by the radial fingers E. The arms H are made of such a length that they will be struck and revolved by the radial fingers E as the machine is drawn forward.

To the lower side of the middle part of the frame C is attached a tapered spout, I, to receive the seed as it is pushed out by the fingers E and guide it into the channel opened by the plow J, attached to the lower end of the plow-standard K, which passes up through a hole in a cross-bar of the frame C and in the rear part of the beam L, attached to the forward part of the said frame C. The standard K is perforated to receive pins M to secure it in place, several perforations being formed in the said standard to receive the said pins, so that it can be adjusted to cause the plow J to enter the ground to any desired depth.

The draft-strain upon the standard K is sustained by the inclined brace N, which has an eye in its rear end to receive the said standard K, and is secured at its forward end to the forward cross-bar of the frame C.

The beam L projects in front of the frame C to receive the draft.

The seed is covered and the top of the ridge is smoothed off by a board, O, attached to spring-hangers P, secured to the rear ends of the side bars of the frame C, so that the said covering-board will yield should it strike an obstruction.

To the frame C are attached the forward ends of the handles Q, by means of which the machine is guided and controlled. The rear parts of the handles Q are connected and held in proper relative positions by a round, R.

Having thus described my invention, what I claim as new, and desire to secure by Letters Patent, is—

In a cotton-seed planter, the combination, with the frame C, the wheels A, the axle B, provided with the fingers E, and the spout I, attached to the under side of the said frame, of the hopper D, having a slot in its bottom decreasing in width from its forward to its rear end, plates F, adjustably secured to the bottom of the hopper, the vertical shaft G, journaled in the hopper, and the horizontal arms H on the said shaft, substantially as herein shown and described.

TALMAN PORTER LOWRY.

Witnesses:
H. C. ROBINSON,
J. G. ANDERSON.